US006626357B1

(12) United States Patent
Ross

(10) Patent No.: US 6,626,357 B1
(45) Date of Patent: Sep. 30, 2003

(54) SELF-SERVICE TERMINAL

(75) Inventor: Ian F. Ross, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/495,760

(22) Filed: Feb. 1, 2000

(30) Foreign Application Priority Data

Feb. 20, 1999 (GB) ............................................ 9903854

(51) Int. Cl.[7] ................................................ G06F 17/60

(52) U.S. Cl. ........................ 235/379; 235/375; 235/380; 235/381; 902/8; 902/9

(58) Field of Search ................................ 235/379, 375, 235/380, 381; 902/8, 9

(56) References Cited

U.S. PATENT DOCUMENTS

| | | | | | |
|---|---|---|---|---|---|
| 3,831,193 | A | * | 8/1974 | McSweeney et al. | 360/42 |
| 3,858,791 | A | * | 1/1975 | Gendron | 229/72 |
| 3,963,900 | A | * | 6/1976 | Sawaguchi et al. | 235/61.7 |
| 3,973,237 | A | * | 8/1976 | Sawaguchi et al. | 235/379 |
| 4,540,106 | A | * | 9/1985 | Fukatsu | 221/13 |
| 4,743,743 | A | * | 5/1988 | Fukatsu | 235/379 |
| 4,754,126 | A | * | 6/1988 | Caldwell | 235/379 |
| 5,136,144 | A | * | 8/1992 | Swinton et al. | 235/379 |
| 5,673,333 | A | * | 9/1997 | Johnston | 382/137 |
| 5,751,842 | A | * | 5/1998 | Riach et al. | 382/137 |
| 5,754,673 | A | * | 5/1998 | Brooks et al. | 382/112 |
| 5,855,434 | A | * | 1/1999 | Hagen | 383/89 |
| 6,125,196 | A | * | 9/2000 | Carey et al. | 382/138 |
| 6,230,928 | B1 | * | 5/2001 | Hanna et al. | 221/13 |
| 6,328,208 | B1 | * | 12/2001 | Artino et al. | 235/379 |

FOREIGN PATENT DOCUMENTS

| | | |
|---|---|---|
| DE | 3236133 | 3/1984 |
| FR | 2755778 | 5/1998 |
| WO | 9008873 | 8/1990 |

OTHER PUBLICATIONS

"Container With Magnetic Stripe for Depositing Cash or Valuables in a Personal Banking Machine", IBM Technical Disclosure Bulletin, US, IBM Corp, New York, vol. 32, No. 6B, Nov. 1, 1989, pp 328–329, XP000073835.

* cited by examiner

*Primary Examiner*—Michael G. Lee
*Assistant Examiner*—Seung H Lee
(74) *Attorney, Agent, or Firm*—Gates & Cooper LLP

(57) ABSTRACT

A self service terminal is provided with a commercial depository (30) which is adapted to receive deposit packages (120) which have been previously issued to individual customers by their bank during a deposit transaction, each deposit package bearing a unique code. The commercial depository (30) is equipped with a deposit identification sensor (90) which reads the code from a deposit package (120) as it is dropped into the depository (30). This code is then reconciled with customer identification data read from a card inserted into a card reader (14) of the terminal at the commencement of the transaction. The deposit package can be returned to a customer after removal and processing of the deposit media by the bank and can be used again in subsequent transactions.

1 Claim, 5 Drawing Sheets

SELF-SERVICE TERMINAL

BACKGROUND OF THE INVENTION

The present invention relates to self service terminals and in particular to a self service terminal suitable for depositing valuable media such as bank notes, cheques and credit slips.

Some automatic teller machines (ATMs) are equipped with commercial deposit transaction facilities. In a typical ATM commercial deposit transaction, a depositor inserts a magnetic user identification card into a card reader slot on the front panel of the ATM and data encoded on the card is read. Instructions are then displayed on the screen of the ATM and the depositor is requested to enter a personal identification number (PIN) via the ATM keypad. The PIN is verified, usually at a central location remote from the ATM and if determined to be correct, a menu of the various facilities available to the depositor is displayed on the screen. The depositor selects a commercial deposit facility and is requested to input the amount of the deposit via the keypad of the ATM. On confirmation of the deposit amount, the depositor is requested to insert the deposit package into a deposit receptacle on the front panel or adjacent the ATM. The deposit package may consist of a plurality of different types of media such as currency, cheques and debit and credit card slips and should be accompanied by a remittance slip prepared by the depositor on which details of the amount of each type of deposit media, together with the total value of the deposit is specified. A receipt for the deposit transaction is printed and delivered to the depositor through a receipt printer slot in the front panel of the ATM.

At present, the remittance slip which is inserted in the deposit bag or envelope is the only way by which the bank can identify the deposit as being that of a specific depositor during subsequent sorting of the deposited media. If the remittance slip is omitted by the depositor, or becomes separated from the deposited media during sorting, the bank may have considerable difficulties in tracing the deposited media to a particular customer. By matching all the deposits in the receptacle to the details of the depositors which have been processed by the interfacing ATM since the receptacle was last emptied, it may be possible to identify a depositor by a process of elimination. However, the elimination process will be successful only if all other depositors have included a remittance slip with their deposit. If this is not the case, the bank may have to wait until a customer claims ownership of the deposit.

Aside from these problems, there is a general reluctance among many customers to use the deposit facility of an ATM due to the complexity of the transaction and a lack of confidence that the deposited media will be correctly identified as that of the depositor, processed and credited to the appropriate account. Hence, many deposit transactions are still handled by human tellers during normal bank opening hours.

SUMMARY OF THE INVENTION

It is an object of the present invention to provide a self service terminal with a deposit facility at which deposit transactions can be carried out by a customer with relative ease and where the customer can have greater confidence that the deposit has been correctly identified and will be correctly processed.

According to a first aspect of the present invention, there is provided a self-service financial transaction terminal comprising:

user interface means to allow a customer to interact with the terminal during a deposit transaction;

depository means adapted to receive a customer deposit package containing any of a plurality of deposit media; characterized by deposit detector means within the depository means for reading identification data from the customer deposit package.

In a preferred embodiment, the self-service terminal preferably includes customer identification means for identifying a customer at the terminal during a deposit transaction, prior to receipt of a deposit package by the depository means.

The self service terminal preferably further comprises processing means for reconciling the identification data read from the customer deposit package with the customer identified at the terminal during the deposit transaction.

According to a further aspect of the invention there is provided a deposit package, characterized by identification tag means bearing a code unique to the deposit package, the identification tag means being adapted to cooperate with the deposit detector means of the self-service terminal according to any preceding claim, during a deposit transaction.

BRIEF DESCRIPTION OF THE INVENTION

An embodiment of the invention will now be described by way of example with reference to the accompanying drawings in which.

DETAILED DESCRIPTION

Figure 1:
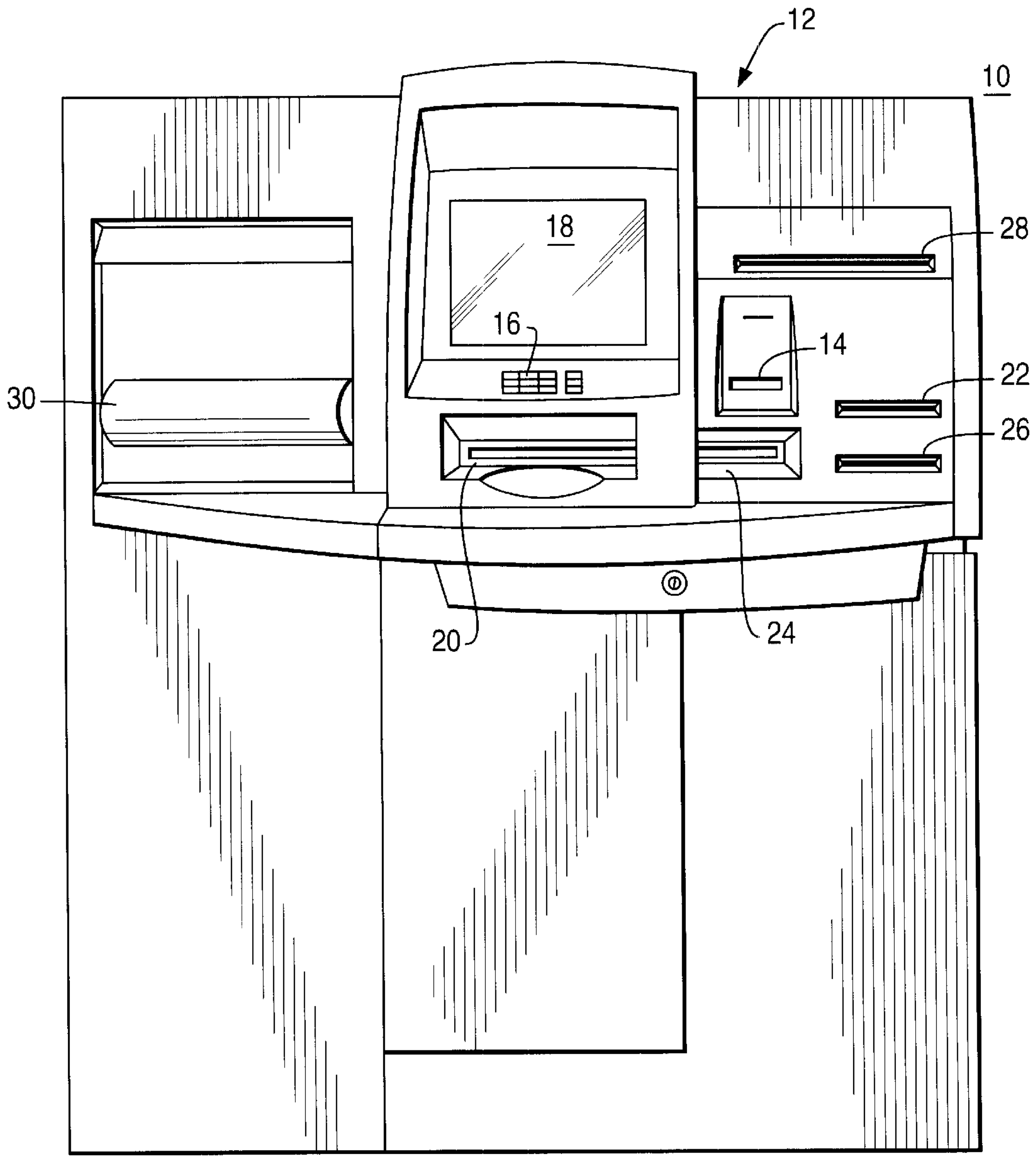
FIG. 1 is an external perspective view of a self service terminal embodying the present invention.

Referring to FIG. 1, the self service terminal (SST) 10 shown therein comprises a user interface 12 to allow a customer to interact with the terminal during a transaction. The user interface 12 includes a card reader slot 14 for insertion of a magnetic user identification card at the commencement of a transaction, a key pad 16 for entering information during a transaction, a display 18 for displaying information to the customer during a transaction, a cash dispensing slot 20 for delivery of currency notes stored inside the SST 10 to a customer during a cash withdrawal transaction, an envelope dispensing slot 22 for dispensing of deposit envelopes to a customer during a personal deposit transaction, an envelope deposit slot 24 for allowing a customer to deposit envelopes during a personal deposit transaction, a receipt printer slot 26 for delivery of a receipt to the customer at the end of a transaction, a statement printer slot 28 for delivery of a printed account statement to a customer during a statement request transaction and a commercial deposit receptacle access door 30 for insertion of deposit packages during a commercial deposit transaction.

It should be understood that the deposits inserted through the envelope deposit slot 22 are normally relatively small in size and are received within a small safe area within the terminal, while deposits inserted through the access door 30 into the commercial deposit receptacle are large and bulky packages. The card reader, cash dispenser, envelope dispenser, envelope deposit, receipt printer, statement printer and commercial deposit modules associated with the respective slots 14, 20, 22, 24, 26, 28 and the access door 30 are designated by the same reference numerals in FIG. 2.

Figure 2:
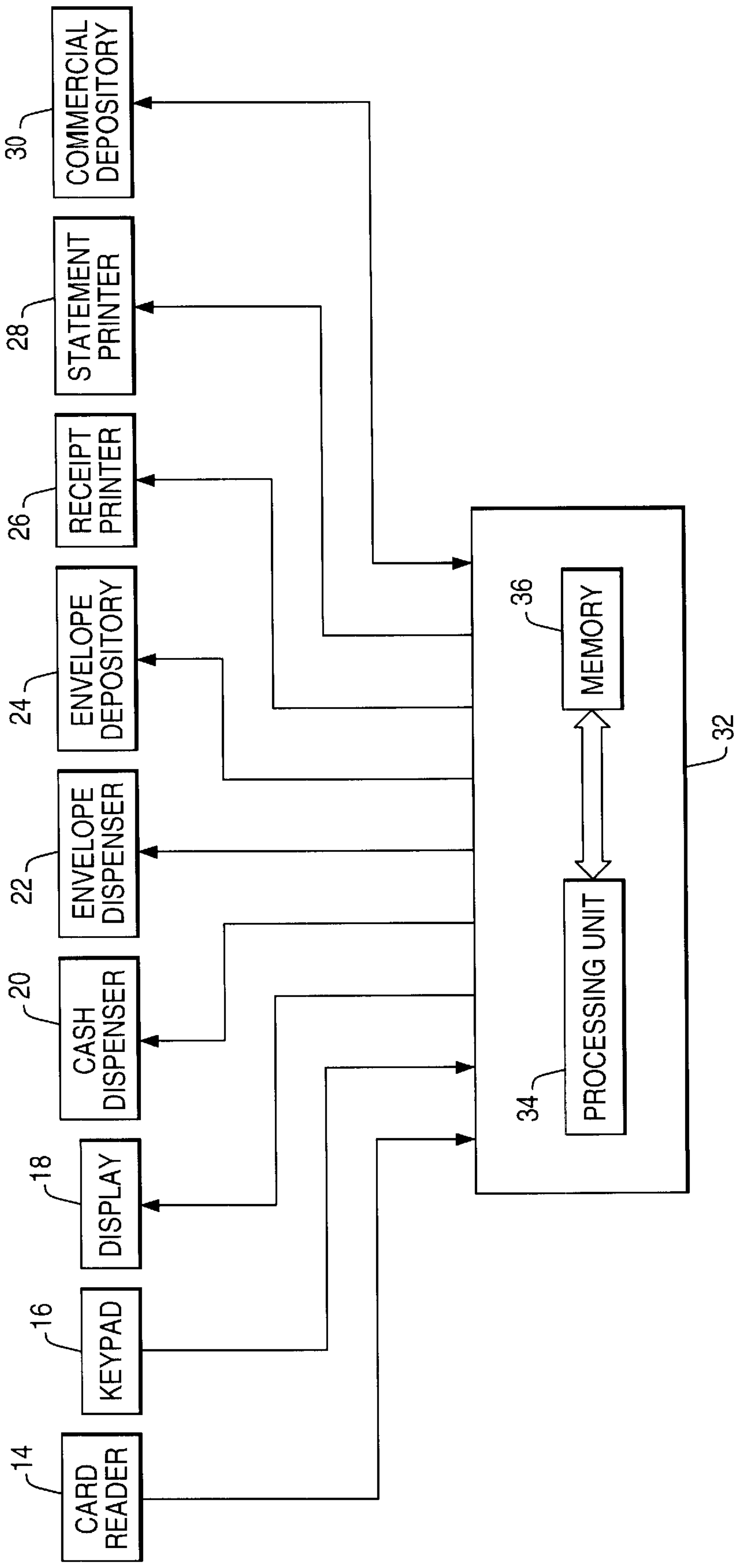
FIG. 2 is a block diagram representation of the terminal of FIG. 1.

With reference to FIG. 2, the SST 10 further comprises a controller unit 32 which communicates with components of the front panel 12. The controller unit 32 includes a processor unit 34 and a memory unit 36 connected via a bus line (not shown) to the processor unit 34. The processor unit 34 receives signals from the card reader module 14, the key pad 16 and the commercial depository module 30 and provides output signals to the display 18, the cash dispenser module 20, the envelope dispenser module 22, the envelope deposit module 24, the receipt printer module 26, the statement printer module 28 and the commercial depository module 30. It should be understood that the processor unit 32 controls the amount of cash dispensed by the cash dispenser 20, the information displayed on the display 18 and the information printed by the receipt printer 26 and the statement printer 28. The processor unit 32 may include a microcomputer, and the memory unit 34 may be a non-volatile RAM. The structure and operation of such microcomputer and memory are well known and therefore will not be described.

Figure 3:
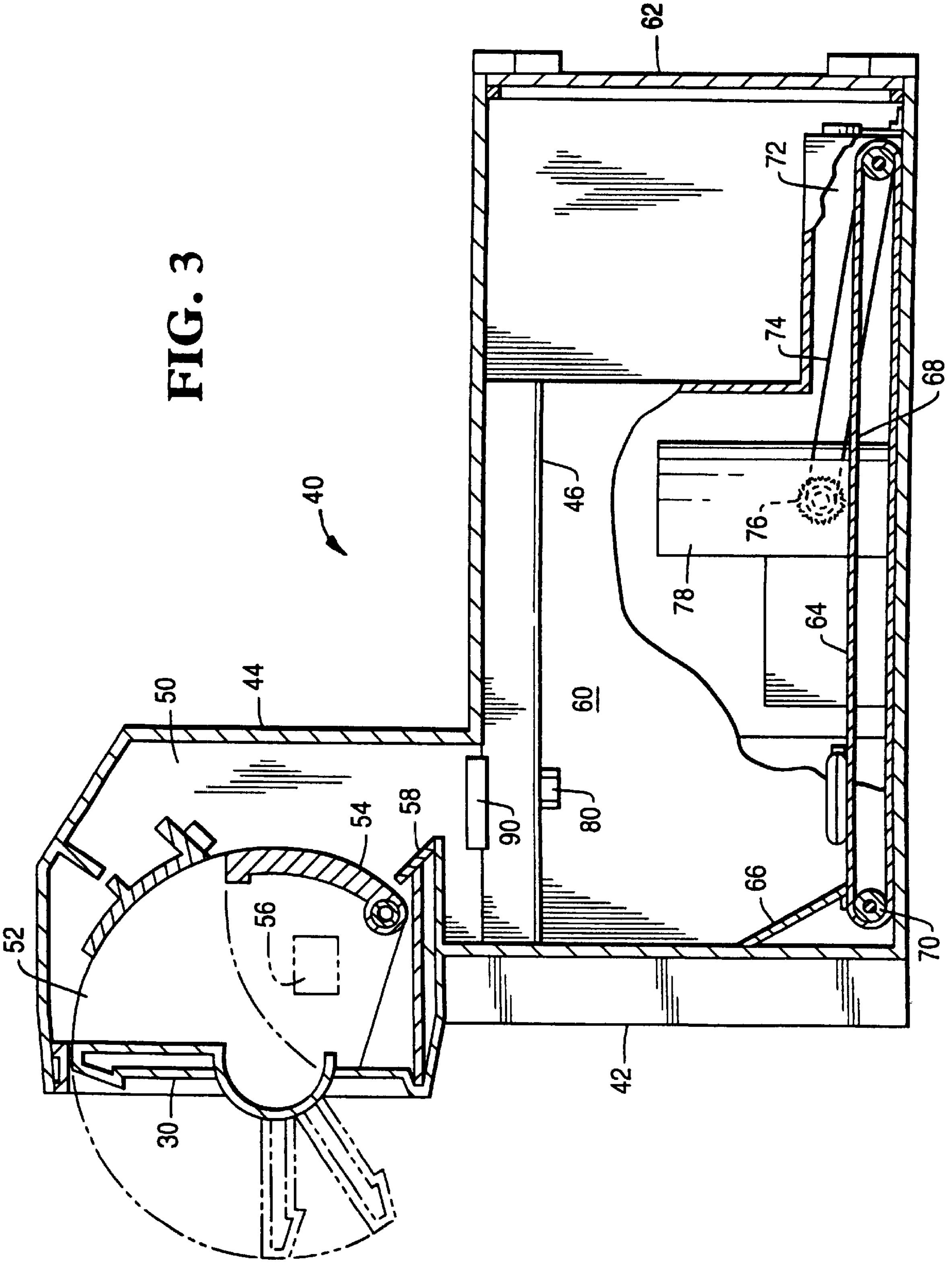
FIG. 3 is a diagrammatic representation of the main operating parts of the commercial depository module of the terminal of FIG. 1.

Referring now to FIG. 3, the commercial depository module of the SST 10 will now be described. The commercial depository module includes a housing 40 having a front wall 42 in which the access door 30 on the user interface 12 is mounted, a rear wall 44 and side walls 46 and 48 (not shown). The housing 40 is fabricated from a penetration resistant material such as high tensile steel and comprises an upper chamber 50 in which a rotary drum 52 is mounted into which packages deposited via the access door 30 are received and a lower collection chamber 60 in which the deposited packages are stored temporarily until their removal therefrom for processing by a financial institution.

The drum 52 is associated with the access door 30 so as to receive a deposit package when the door 30 is open and is provided with an exit flap 54 which is arranged to allow the deposit package received therein to exit the drum 52 when the access door 28 is closed again. Access to the interior of the depository through the access door 30 is controlled by a solenoid latch 56, which is actuated under the control of the controller unit 32 (FIG. 2). A first deflector 58 is provided adjacent the exit flap 54 of the drum 52 to guide the deposited package from the upper chamber 50 into the lower chamber 60.

A further access door 62 is provided in the rear wall 44 of the housing 40 in the lower chamber 60 to allow authorized operating personnel to access the chamber 60 so as to remove deposited packages therefrom for subsequent processing by a financial institution. A transport platform 64 extends across the base of the lower chamber 60 and when activated serves to transport the deposited packages which have fallen thereon towards the access door 62 so as to facilitate access to the deposited packages by the authorized operating personnel.

A second deflector 66 is located within the lower chamber 60 and is secured to the front wall 42 adjacent the transport platform 64. This deflector 66 prevents deposited packages entering the lower chamber 60 from falling between the front wall 42 and the end of the transport platform 64 and causing a jam. Similar deflectors (not shown) are secured to the rear wall 44 and the two side walls 46 and 48, adjacent the transport platform 64 to ensure that deposited packages fall thereon.

The transport platform 64 comprises an endless belt 68 mounted on a front roller 70 and a rear roller 72. The rear roller 72 is driven through a chain 74 and gear mechanism 76 and by a motor 78 which is also located in the lower chamber 60. A switch (not shown) is located on the rear wall 44, adjacent the access door 62 and may be actuated by authorized personnel accessing the lower chamber 60 to operate the transport platform 64, moving deposits which will tend to accumulate towards the front end of the platform 64 toward the access door 62, where they can be readily removed from the depository.

As deposits fall from the drum 52 into the lower chamber 60, they will tend to accumulate on the transport platform 64 toward the front end of the lower chamber (i.e., toward the front wall 42 of the housing 40). After a period of time, a pile of packages may form on the transport platform and may become high enough to extend into the upper chamber 50, causing problems with the operation of the drum 52. To prevent such an occurrence, a reflector 80 and an optical sensor 82 (not shown in FIG. 3) are oppositely disposed in parallel relation to each other on the side walls 46 and 48 of the housing 40 in the lower chamber 60 at a level below the opening between the upper and lower chambers 50 and 60.

In operation, a light beam emitted by a light source in the optical sensor 82 is reflected by the reflector 80 on the opposite side wall of the housing 40 back toward the optical sensor 82 and is detected by a photocell in the optical sensor 82. When the accumulated pile of deposited packages in the lower chamber 60 reaches a height corresponding to the position of the reflector 80 and optical sensor 82 on the side walls 46 and 48, the path of the light beam is blocked by the deposit packages and the photocell fails to be triggered. This interruption in the detected light beam causes the optical sensor 82 to transmit a signal to the processing unit 32 which automatically activates the transport platform 64 causing the pile of deposited packages to be moved towards the rear wall 44 of the housing, leaving empty space at the front end of the transport platform 64 for subsequent deposits.

It should be understood that the double light beam between the optical sensor 82 and the reflector 80 will be broken momentarily by deposits as they drop through the lower chamber 60 toward the transport platform 64 below. However, the circuitry associated with the optical sensor 82 is designed so as to transmit a signal to the processor unit 34 only when the duration of the light beam interruption exceeds a certain value.

A deposit identification sensor 90 is mounted adjacent the opening between the upper and lower chambers 50 and 60 and is arranged to co-operate with a magnetic identification tag on an appropriate deposit package as it falls though the opening so as to read information stored thereon. The deposit identification sensor 90 and the magnetic identification tag used are of the type described in the published PCT patent application WO 96/31790 ( Scientific Generics Limited) and British patent applications GB 2312595 and GB 2314418 (Flying Null Limited) and involve spatial magnetic interrogation techniques based on exploiting the behavior of magnetic materials as they pass through a region of space containing a magnetic null (i.e., a plane within which the component of magnetic field in a given linear direction is zero). In response to such interrogation, the identification tag emits magnetic signals which may be detected by suitable receiving equipment.

Figure 4:
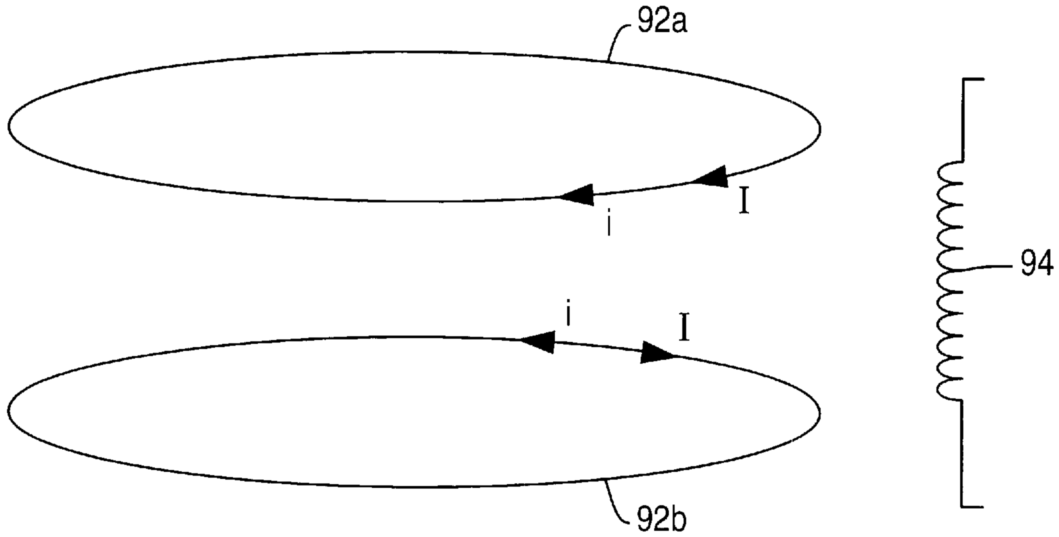
FIG. 4 is a diagrammatic representation of the deposit identification sensor of the terminal of FIG. 1.

The sensor 90 will be described with reference to FIG. 4 and comprises a pair of closely-spaced, oppositely wound identical coils 92*a*, 92*b* arranged with their axes coincident. A dc current is passed through the coils causing opposing magnetic fields to be set up on the coils axis and the creation of a magnetic null along the coils axes midway between the two coils 92*a*, 92*b*. This dc current is of sufficient magnitude to cause saturation of the magnetic material of a magnetically encoded identification tag 122 on a deposit package

120 as it passes though the center of the two coils 92*a*, 92*b*. An ac current of much lower amplitude is also passed through the coils 92*a*, 92*b* in opposite directions. This ac current generates an interrogating magnetic field which interacts with the magnetic identification tag 122 on the appropriate deposit package 120 as it passes through the region of zero magnetic field to produce a detectable response. A series of receiver coils 94 is disposed adjacent the zero magnetic field region and is arranged to detect the magnetic response of the identification tag 122 at the magnetic null. The receiver coils are preferably constructed as an assembly of printed circuit boards whose conductive tracks are interconnected to form a three dimensional coil having windings in the various layers. The operation of the deposit identification sensor 90 will be described in further detail below.

It should be understood that the magnetic field used in the deposit identification sensor 90 may be generated by use of one or more appropriately disposed permanent magnets or by a suitable combination of coils and magnets.

Figure 5A:
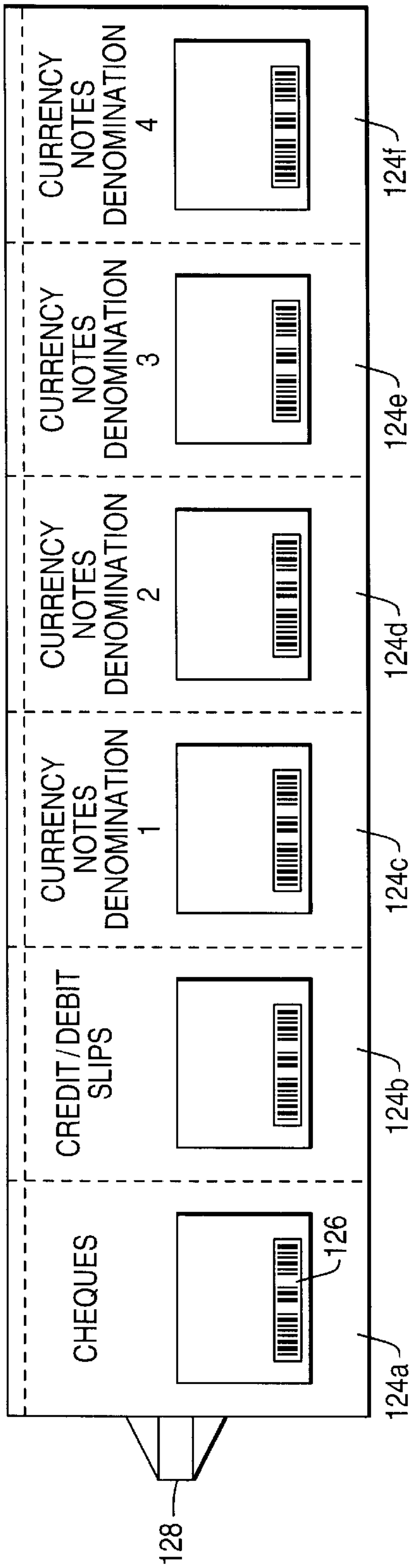
FIGS. 5A and 5B are perspective views of a deposit package for use in a deposit transaction at the terminal of FIG. 1, the package being shown in an open condition in FIG. 5A and in a closed condition in FIG. 5B.
Figure 5B:
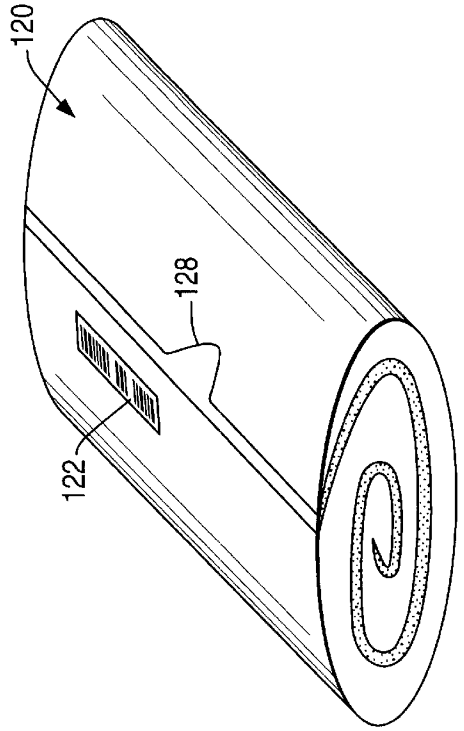

FIGS. 5A and 5B illustrate a typical transaction deposit package 120 suitable for use in a commercial deposition transaction at the self service terminal of the present invention. As can be seen from FIG. 5A, the package 120 comprises an elongate rectangle of a clear plastic material, having a series of individual pockets 124*a–f* along the length of the internal surface thereof, for holding deposit media of different types. For example, cheques may be inserted into one pocket 124*a*, credit and/or debit slips 124*b* into another, while currency notes of different denominations may be inserted into separate pockets 124*c*–124*f*. Each pocket 124 has a bar code 126 on its outer surface containing encoded depositor and media type data to facilitate subsequent manual processing of the contents of the deposit package 120 when it is removed from the self service terminal 10. A magnetic identification tag 122 bearing an identification code unique to that package is provided at one end of the package 120 on the opposite surface to that of the pockets 124, such that when the package 120 is rolled up as shown in FIG. 5B, the identification tag 122 is disposed on the outer surface thereof. A seal 128 is provided for holding the rolled-up package 120 together.

Figure 6:
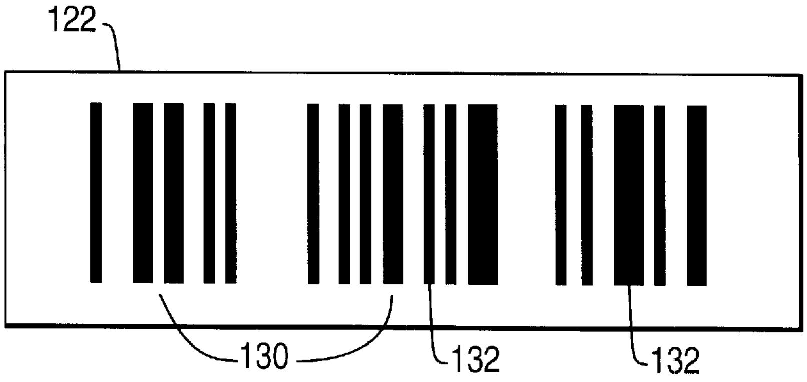
FIG. 6 is a diagrammatic representation of the identification tag of the deposit package of FIGS. 5A and 5B.

As illustrated in FIG. 6, the magnetic identification tag 122 comprises a substrate of a thin plastics material, for example, polyethylene terephthalate (PET), which is coated with a layer of a low coercivity, high permeability amorphous magnetic alloy. Selected regions of the substrate are coated with a high coercivity magnetic recording material, many suitable types being readily available from suppliers of recording media. These regions of magnetic recording material are in the form of a series of bands 130 of individual strips 132 arranged perpendicular to the axis of magnetization of the layer of the magnetic alloy. The strips 132 within each band 130 have identical magnetic properties, but the width of individual strips and the distance between individual strips 132 in each band 130 varies in accordance with the code to be represented, in a similar way to a bar-code. The arrangement of strips 132 within each band 130 is such that the identification tag 122 will bear an unique multi-bit code representative of a particular deposit package 120.

A typical deposit transaction at a self service terminal will now be described with continuing reference to FIG. 6 and to FIGS. 1 to 5B. It should be understood that the depositor will have obtained one or more deposit transaction packages 120 such as that described above from his bank and that each deposit package 120 will have a magnetic identification tag 122 bearing a unique magnetic code. The depositor who may be a retailer or other small business operator will prepare the deposit by sorting the deposit media into different categories (cheques, credit notes, debit notes and different currency denominations) and adding up the total of each category. The depositor will make a note of the amount of each category and of the total amount of the deposit as this will be required subsequently during the deposit transaction at the self service terminal 10. The deposit media of each category are inserted into the appropriate pockets 124*a–f* of the package 120 which is then rolled up and sealed as shown in FIG. 5B.

On arrival at the SST 10, the depositor inserts his magnetic user identification card into the card reader slot 14 provided on the user interface 12 thereof and data encoded on the card is read. If the card is accepted, a message is displayed on the display screen 18 requesting the depositor to enter a personal identification number (PIN) via the keypad 16. The PIN is verified usually at a central location remote from the SST 10 and is determined to be correct, a menu of the various facilities available to the depositor, including a commercial deposit facility, are displayed on the display screen 18.

If the commercial deposit facility is selected, the depositor is requested to enter details of the deposit. A menu of the various categories of deposit media is displayed on the screen 18 and the depositor selects the appropriate categories and enters the total amount of each. The depositor is then requested to enter the total amount of the deposit which should correspond to the sum of the individual amounts for each of the deposit categories already entered. If there is any discrepancy between the total amount entered and the sum of the amounts of each category, an error message is displayed and the depositor is requested to make the necessary corrections. If no discrepancy is detected, the depositor is requested to confirm the details of the deposit which have been entered.

On confirmation of the deposit details, a message requesting the depositor to lodge the deposit package 120 in the commercial deposit receptacle 30 is displayed on the screen 18. The solenoid latch 56 of the rotary drum 52 of the upper chamber 50 of the deposit module is deenergized by the controller unit 30, allowing the depositor to open the deposit receptacle access door 28 in the user interface 12. As the access door 28 is pulled outward by the depositor, the rotary drum 52 is caused to rotate in an anticlockwise direction with reference to FIG. 3. The deposit package 120 is dropped through the access door 28 into the rotary drum 52 and the access door 28 is closed, causing the drum to rotate in a clockwise direction with reference to FIG. 3 back to its normal position. The solenoid latch is reenergized, preventing the access door 28 from being reopened and the deposit packet falls through the exit flap 56 out of the rotary drum 52.

As the package 120 falls through into the lower chamber 60, it passes through the center of the coils 92*a* and 92*b* of the deposit identification sensor 90 and the magnetic identification tag 122 on the outer surface thereof is exposed to the interrogating magnetic field therein. Each strip 132*a–f* of the bands 130 of high permeability magnetic material on the identification tag 122 will initially become saturated by the dc current magnetic field as it passes through the high saturating magnetic field. As the leading strip 132*a* of the first band 130 of the identification tag 122 enters the zero field region, harmonics of the AC signal are generated as the magnetic material responds to the changing field. As the strip 132*a* straddles the narrow zero field region, it is driven on the linear part of its B-H loop and interacts by re-radiating only the fundamental interrogation frequency. As the strip 132*a* leaves the zero field region, it again emits harmonics of the interrogation field frequency. The receiver coils 94 are arranged to pick up the signals produced at the zero field region and from the variation of these signals with time, the passage of the strip 132*a* of magnetic material of the identification tag 122 through the region of magnetic null can be clearly detected. As the package continues to fall through the magnetic field, the passage of each successive strip 132*b*–*f* of the magnetic material of each band 130 of the identification tag 122 will be detected in a similar way.

The signals detected by the receiver coils 94 are fed to the processor unit 34 of the controller 32 of the ATM and the unique multi-bit code of the deposited package 120 which is represented by the various widths of the magnetic strips 132 of each band 130 and the spacings therebetween is identified therefrom. The code thus read from the identification tag 122 on the deposit package 120 is then associated with the customer identification data previously read from the card inserted by the customer during the transaction and the processing means 34 causes the customer identification data and the associated deposit package code to be stored in a deposit transaction log in the memory unit 36.

When the data read from the depositors card and the code read from the identification tag 122 on the package deposited have been associated, a message acknowledging that the deposit package 120 bearing a specific identification code has been safely received in the commercial deposit receptacle 30 is displayed on the screen 18 of the ATM. The user's identification card is then returned to the depositor via the card reader slot 16 and a receipt giving details of the transaction and acknowledging receipt of a deposit package 120 bearing the specific identification code thereon is printed by the receipt printer module 26 and is presented to the depositor through the corresponding slot in the user interface 12. The transaction is now complete and the deposited package 120 is temporarily stored in the lower chamber 60 until it is subsequently removed therefrom by maintenance personnel for processing. The deposit package 120 can eventually be returned to the same or a different customer after processing by the relevant financial institution and can be reused in subsequent transactions.

Fraudulent transactions may occur where the depositor fails to insert anything into the commercial deposit receptacle 30 or where an article other than the appropriate deposit package 120 bearing the magnetic identification tag 122 is deposited. In such an instance, the deposit identification sensor 90 will fail to detect a magnetic identification tag 122 and the processor unit 34 will cause a message to this effect to be displayed on the screen The message will also advise that the depositor's card will be retained by the ATM for security reasons. The transaction is terminated and the depositor will have to contact the relevant financial institution in order to resolve the matter.

The deposit transaction log stored in the memory unit 36 will be printed off by maintenance personnel on subsequent removal of deposited packages from the lower collection chamber 60 of the commercial depository 30. Alternatively or additionally, the data stored in the deposit transaction log may be transmitted from the ATM to a remote host computer for processing.

By use of a deposit identification sensor within the commercial depository module which is adapted to read a magnetic code unique to an individual deposit package as it is deposited by a customer during a transaction, facilitates the subsequent processing of the deposits by a financial institution since each deposit package can be matched to a particular customer without the need for inclusion of remittance slips. In addition, since receipt of a deposit package bearing a specific unique code is acknowledged on the screen during the transaction and again on a printed receipt at the end of the transaction, the customer is reassured that his deposit has been correctly identified and his confidence that the deposit will be subsequently be processed and credited to the appropriate account is improved.

The invention also minimizes opportunities for fraud during deposit transactions at the self service terminal. In the event that a customer fails to insert a deposit package within the depository 30 or inserts an object other than a deposit package of the type which has been pre-issued to that customer for deposit transaction purposes, failure to detect a magnetic identification tag will cause the transaction to be terminated. Since no code will be associated with the customer identification data and stored in the deposit transaction log, it will not be possible for a customer to subsequently fraudulently claim that a deposit was made during the transaction.

It should be understood that the identification tag 122 on the deposit package could be customized to carry a code representative of the actual depositor to which the package is issued by the relevant financial institution. In such a case, the code read from the deposited package 120 is compared with the customer identification data read from the card inserted by the customer during the transaction by the processing means 34 and if they correspond, the transaction is deemed successful. If the code on the package 120 and the customer identification data read from the card do not correspond, the transaction is terminated and the depositor's card is retained by the ATM. This reduces the risk of someone attempting to fraudulently deposit a package which does not belong to them and have the deposit credited to a different account.

Where the deposit package 120 bears a code representative of a specific depositor, it should be understood that a deposit transaction could be carried out with the customer being identified solely by the identification tag 122 on the deposit package 120. In such an instance, the terminal would be adapted to allow the deposit package 120 to be deposited by the customer in the commercial depository 30 without having first identified the customer. On detection of the identification tag 122 by the deposit identification sensor 90 within the commercial depository 30, an acknowledgement of receipt of a deposit package identified as that of the customer would be displayed on the screen 18 of the user interface 12 of the terminal and a receipt issued to the customer via the receipt printer slot 26. If no identification tag 122 is detected on the package 120, a message to this effect is displayed and the customer is advised to contact the relevant financial institution to resolve the matter.

It should also be understood that a customer could initially be identified by various other means rather than by reading data from a magnetic card or a smart card inserted by the customer during a transaction. For example, biometric means such as iris recognition techniques in which the iris pattern of a customer's eye is compared with reference digitized iris images, could be used to identify the customer.

What is claimed is:

1. A deposit package for use with a self-service terminal, the package comprising:

a plurality of individual pockets in which each pocket holds a different media category so that different media categories are segregated within the deposit package; and identification data for automatic reading by the self-service terminal;

each of the plurality of individual pockets having an associated identification code containing encoded depositor and media type data to facilitate subsequent manual processing of the contents of the deposit package.

* * * * *